United States Patent [19]

Johnson

[11] 4,446,608

[45] May 8, 1984

[54] VALVE SPRING COMPRESSOR FOR INTERNAL COMBUSTION ENGINE

[75] Inventor: Joel S. Johnson, Troy, Mich.

[73] Assignee: Kent-Moore Corporation, Warren, Mich.

[21] Appl. No.: 401,873

[22] Filed: Jul. 26, 1982

[51] Int. Cl.[3] .............................................. B23P 19/04

[52] U.S. Cl. ................................ 29/220; 29/156.7 R; 29/426.5; 29/402.08; 29/215

[58] Field of Search .......... 29/156.7 R, 426.5, 402.08, 29/215, 216, 219, 220, 267

[56] References Cited

U.S. PATENT DOCUMENTS

| | | | |
|---|---|---|---|
| 1,852,863 | 4/1932 | Stark | 29/215 |
| 1,974,363 | 9/1934 | Miller | 29/215 |
| 2,173,398 | 9/1939 | Michener et al. | 29/220 |
| 3,977,064 | 8/1976 | Mote et al. | 29/216 |
| 3,979,811 | 9/1976 | Kammeraad | 29/215 |
| 4,050,275 | 9/1977 | Schlegal | 29/156.7 R X |
| 4,176,435 | 12/1979 | Castoe | 29/220 |
| 4,372,023 | 2/1983 | Castoe | 29/256 |

OTHER PUBLICATIONS

Sales Literature of Kent-Moore Tool Division, for: J 23591 Camshaft Remover and Installer Tool (Exhibit A), J 24824 Valve Spring Compressor Tool (Exhibit B).

*Primary Examiner*—Charlie T. Moon
*Assistant Examiner*—R. S. Wallace
*Attorney, Agent, or Firm*—Burton, Parker & Schramm

[57] ABSTRACT

Valve spring compressor tool for internal combustion engines having an overhead camshaft. The tool has a fulcrum bracket removably attached to the engine providing means to pivot a lever, and a lever assembly having a depressor member used to depress the valve spring and means to retain the lever in position to hold the valve spring in the depressed state.

6 Claims, 8 Drawing Figures

VALVE SPRING COMPRESSOR FOR INTERNAL COMBUSTION ENGINE

FIELD OF THE INVENTION

This invention relates to the field of valve spring compressors for internal combustion engines and more particularly to engines with overhead valves and a camshaft located in the cylinder head.

BACKGROUND OF THE INVENTION

Internal combustion engines, particularly those used in automobiles, are typically constructed using two main stationary components: an engine block and a cylinder head. The engine block has a plurality of bores, each containing a piston assembly. The pistons are attached to a crankshaft, which is also supported by the engine block, by way of connecting rods in such a fashion that as the pistons reciprocate in the bore the crankshaft is caused to rotate. The cylinder head is attached to the engine block so that each cylinder bore is separately enclosed so that the piston cylinder wall and cylinder head form an enclosed volume. Air and fuel enter this cylinder volume by way of an intake port which is typically sealed by a round poppet valve. A sparkplug also protrudes into this volume so that the mixture can be ignited. The burned exhaust products are removed from the cylinder volume through an exhaust port which is also sealed by a round poppet valve. The intake and exhaust valves can be located either in the engine block or in the cylinder head, provided that they communicate with the chamber volume. When both intake and exhaust valves are located in the cylinder head, the engine is typically referred to as an overhead valve design.

Movement of the intake and exhaust valves is controlled by a camshaft. The camshaft has eccentric lobes which are mechanically coupled to the valves so when the camshaft is rotated the opening and closing of the valves is timed with the movement of the crankshaft. When the camshaft is located in the engine block, the design is typically referred to as a cam-in-block design. When the camshaft is located in the cylinder head, the design is typically referred to as an overhead cam design.

It is common practice in engines with overhead valves, particularly those with overhead camshafts, to remove the cylinder head when it is necessary to service the valve springs or the valve stem seals. Upon reassembly, it is necessary to clean the cylinder head and engine block surfaces and install a new cylinder head gasket. In those engines where an overhead camshaft is contained in a cam carrier, removal of the head bolts to free the cam carrier frequently breaks the head gasket seal, requiring replacement of the gasket. The Opel 1.8 liter Family Two engine in the past required removal of the cylinder head in order to service the valve springs or valve seats. This invention will allow the mechanic to remove the camshaft to service the valves without removal of the cylinder head or the cam carrier.

In order to access the valves in most overhead camshaft engines, it is necessary to first remove the camshaft. The camshaft is supported on a series of bearing surfaces in the cylinder head or in the camshaft carrier. When these bearing supports are equipped with removable caps, the camshaft may be removed vertically from the cylinder head. In many engines, however, the camshaft must be removed axially because there is no provision in the engine to split the bearing support. In these instances it is necessary to remove the lifter plates or to depress the valves so that there is sufficient clearance for the camshaft to be removed axially. The Opel 1.8 liter Family Two engine has lifter plates securely held beneath the camshaft pivoted on one end on a hydraulic lash adjuster and the other end cooperating with the valve. When the camshaft is rotated, the lobe depresses the center of the lifter plate, causing it to pivot on the lash adjuster and depress the valve.

Service tools have been developed in the past to remove camshafts and valve springs from specific overhead cam engines. These tools cannot be adapted to function in the 1.8 liter Opel Family Two design. A prior art valve spring compressor is the J-23591 tool made by Kent-Moore Tool Division of Roseville, Mich., and designed to fit the 2.3 liter Chevrolet Vega and Pontiac Astra engines. The valve cover which is fastened to the cylinder head to seal the valve mechanism from the atmosphere is removed to provide access to the valves and camshaft. The J-23591 tool is attached to the engine using the thread holes for the bolts retaining the valve cover. The tool is used to depress all the lifters and valves simultaneously so that the camshaft can be removed from the cylinder head. This device consists of a bracket, shaft, and four fingers which pivot on the shaft and depress the lifters when a bolt pivotably mounted on the end of the finger is tightened against the mounting bracket. The construction of the Vega cylinder head is significantly different than that of the Opel 1.8 liter. When the Vega camshaft cover is removed, the cam and lifters are exposed and the mounting bracket can be positioned below the center line of the camshaft.

Another example of a prior valve spring compressor design is the J-24824 tool made by Kent-Moore Tool Division to be used with the Cosworth Vega engine made by Chevrolet Motor Division of General Motors. This engine has two overhead camshafts which are mounted in a carrier which can be removed from the cylinder head without disturbing the head bolts. A shaft assembly is bolted to the cylinder head, and a hook-shaped tool is used to individually press valve springs so that the keepers can be removed from the stem. With this tool, like the 2.3 liter Vega engine, it is necessary to pressurize the cylinder with an adapter threaded into the sparkplug hole so that the valves are held firmly in the seated position while the spring is being depressed.

SUMMARY OF THE INVENTION

I have discovered an apparatus and method in which the camshaft can be removed from a 1.8 liter Opel engine without removing the cylinder head or head bolts. In engines where the valve cover is located in the head directly above the camshaft as in the 1.8 liter Opel engine, access to the valve is obstructed by the location of the camshaft. My invention allows the user to reach below the cam and depress the valve spring so that the lifter plate may be removed. After all the lifter plates are removed, the camshaft may be withdrawn from the cylinder head. After the camshaft is removed, my tool can then be used to depress the valve spring so that the keepers can be removed and the valve spring and the valve stem seal can be serviced. The use of my tool can significantly reduce the service time and the cost in servicing valve stem seals and valve springs, since the cylinder head gasket does not have to be replaced, nor the head removed.

With my valve spring compressor, a valve can be depressed and locked in place so that both of the mechanic's hands are free to remove the rocker arm from underneath the camshaft and the rocker arm retainer from atop the valve stem. After removal of the rocker arm, the valve spring can be released and the tool moved to the next valve and the procedure repeated until all rocker arms have been removed. My tool allows the mechanic to service both the intake and exhaust valves by positioning the tool on one of two shafts in the support bracket. The support bracket and the lever arm do not interfere with any of the engine accessories and the lever arm is designed to be easily accessible to the mechanic from the front of the vehicle, whether he is working on an intake or exhaust valve.

BRIEF DESCRIPTION OF THE PREFERRED EMBODIMENT

Figure 1:
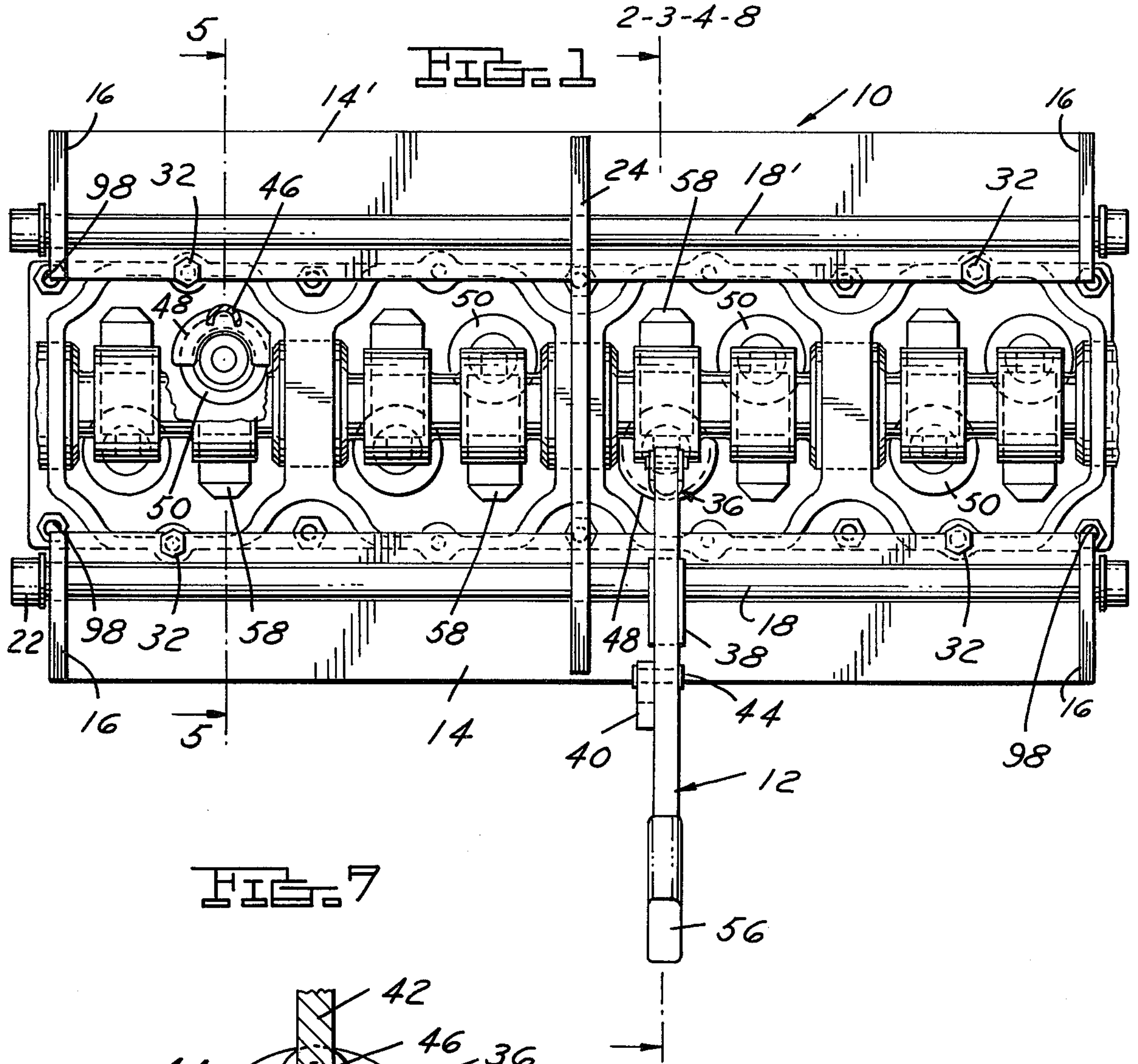
FIG. 1 is a top view of the cylinder head with the support bracket and valve spring compressor tool in place.

Referring to the drawings, the novel valve compressor comprises two main components: a support bracket assembly 10 and a lever assembly 12. The support bracket assembly 10 can be removably attached to the engine to provide a fulcrum for the lever assembly 12. The support bracket assembly 10 includes a pair of elongated plates 14 and 14' both having upturned ends 16. A pair of pivot shafts 18 and 18' extend through clearance holes 20 in support bracket ends 16. Retainers 22 are pressed on the ends of the shafts 18 to retain them in place. A cross brace 24 extends between and is welded to the plates 14 and 14' having holes 26 to provide clearance for shafts 18. The cross brace 24 serves to hold the plates 14 in fixed parallel spaced apart relation. The pivot shafts extend through holes 20 and 26 in the cross brace. Plates 14 have four notches 28 as shown. The bracket assembly 10 is attached to the engine after the camshaft cover (not shown) is removed, by supporting it on the camshaft carrier 30 by four bolts 32, which extend through notches 28 in the bracket and engage the camshaft carrier 30 at threaded holes 34 which are normally used to attach the valve cover.

Figure 7:
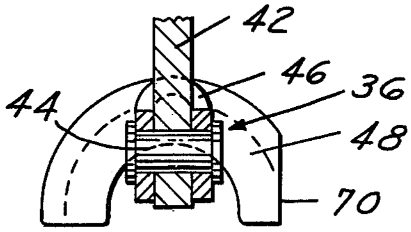
FIG. 7 is a section through the spring leg depressor assembly showing the details of the foot shape.
Figure 2:
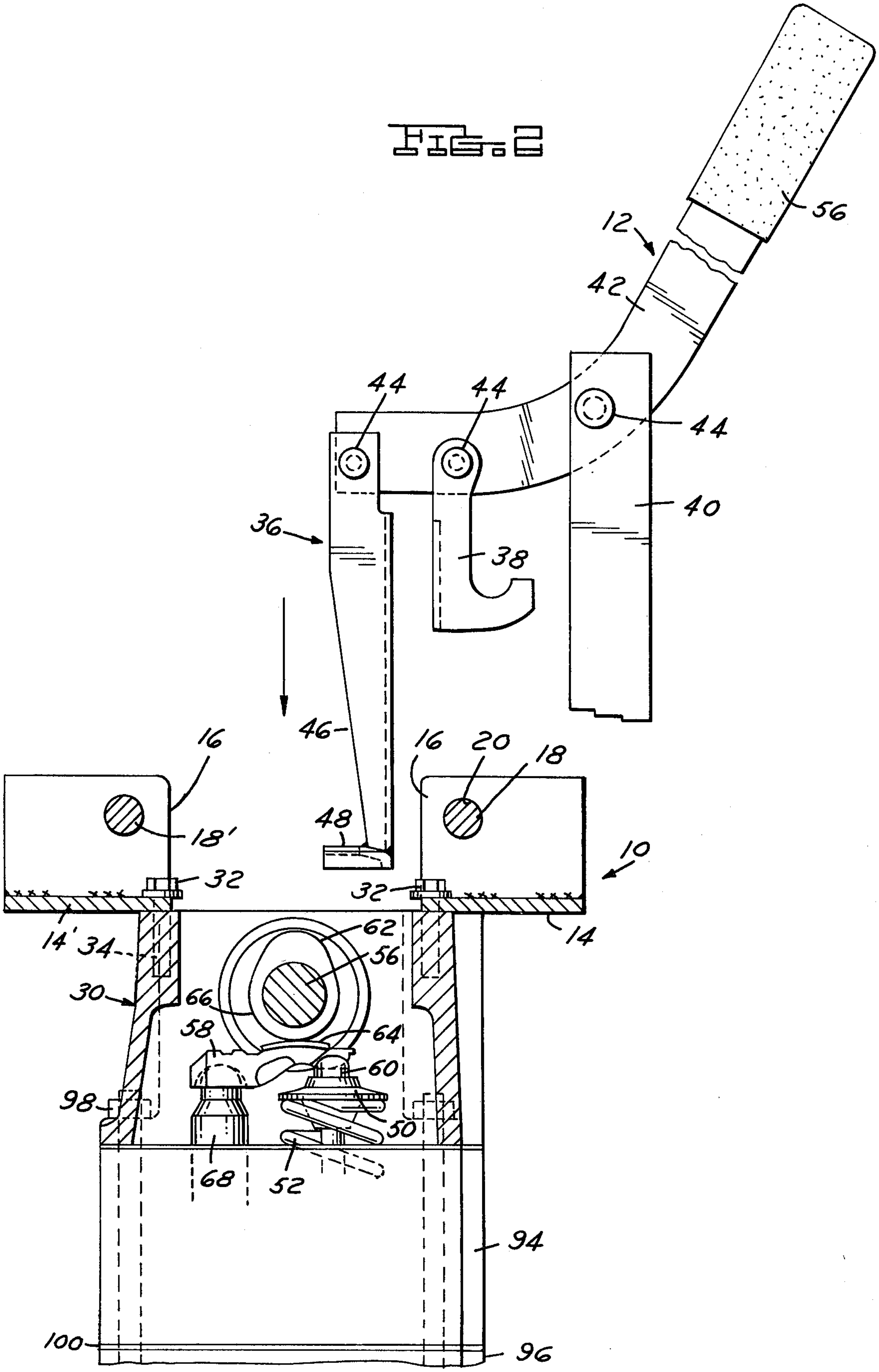
FIG. 2 is a side elevation taken on line 2—2 of FIG. 1, showing the support bracket mounted on the engine and the valve spring compressor preparatory to attachment to the bracket.
Figure 3:
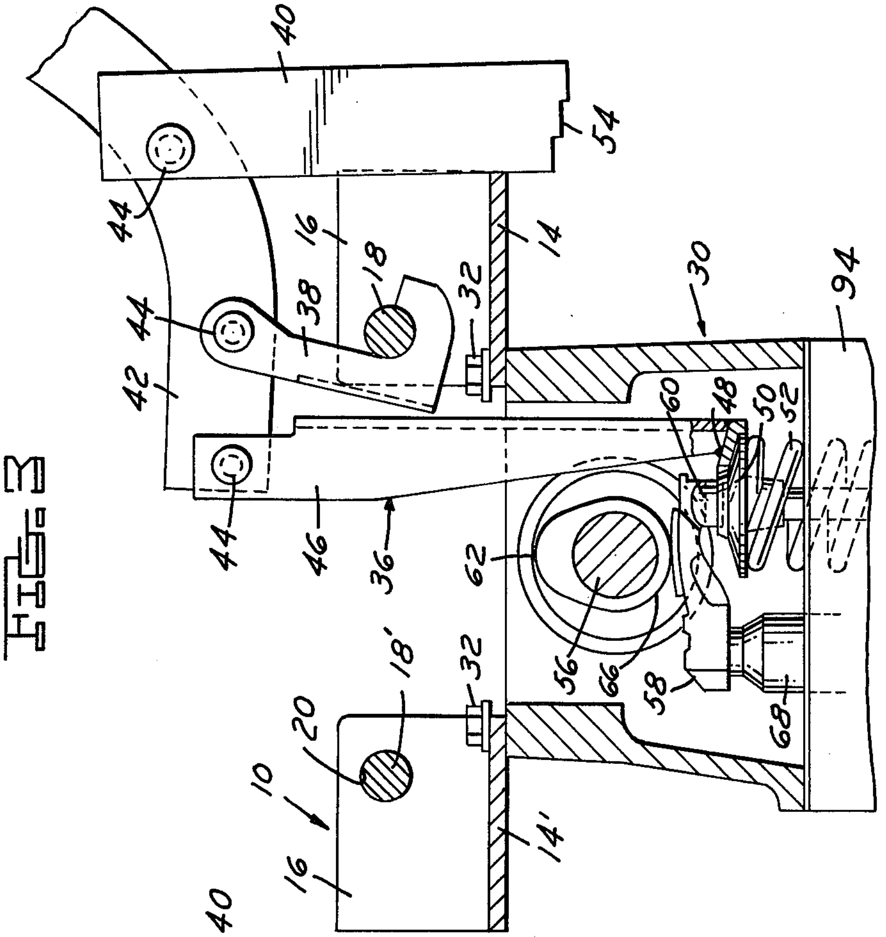
FIG. 3 is a side elevation similar to FIG. 2 but showing the valve spring compressor installed on the support bracket just prior to spring compression.
Figure 4:
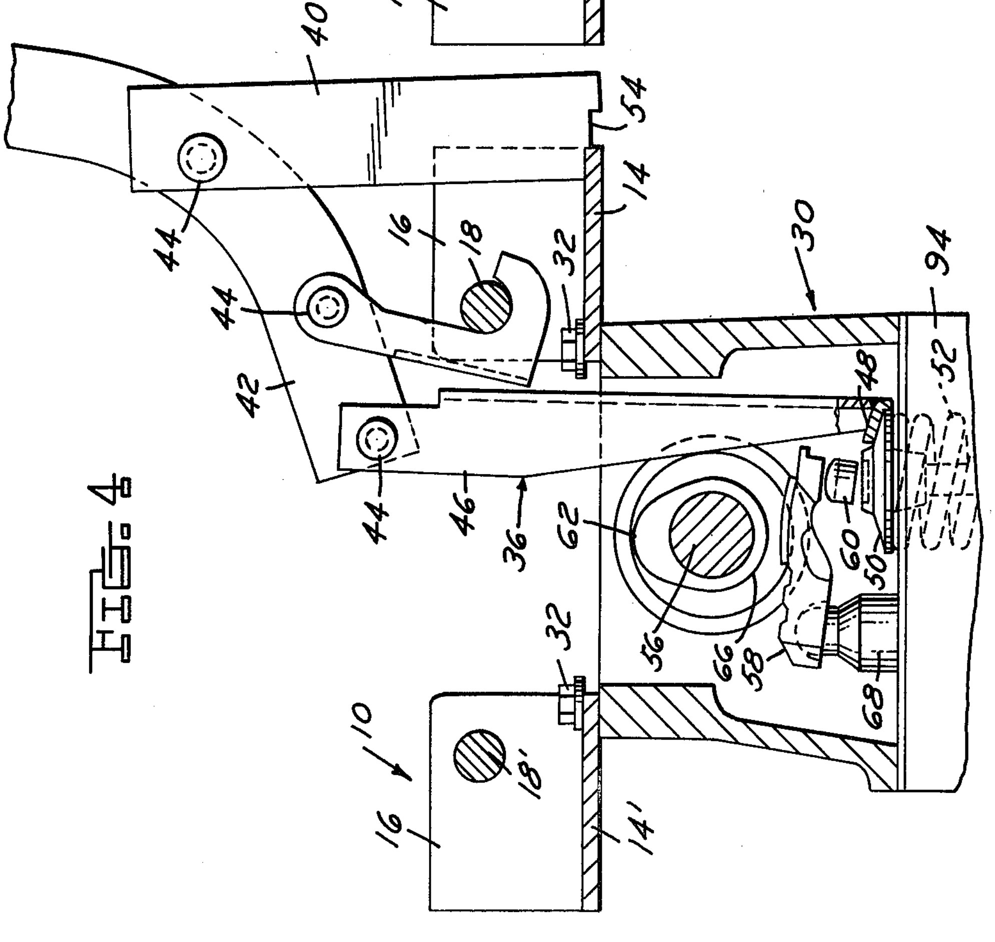
FIG. 4 is a side elevation similar to FIG. 3 but showing the valve spring compressed and the rocker arm in a free position.
Figure 6:
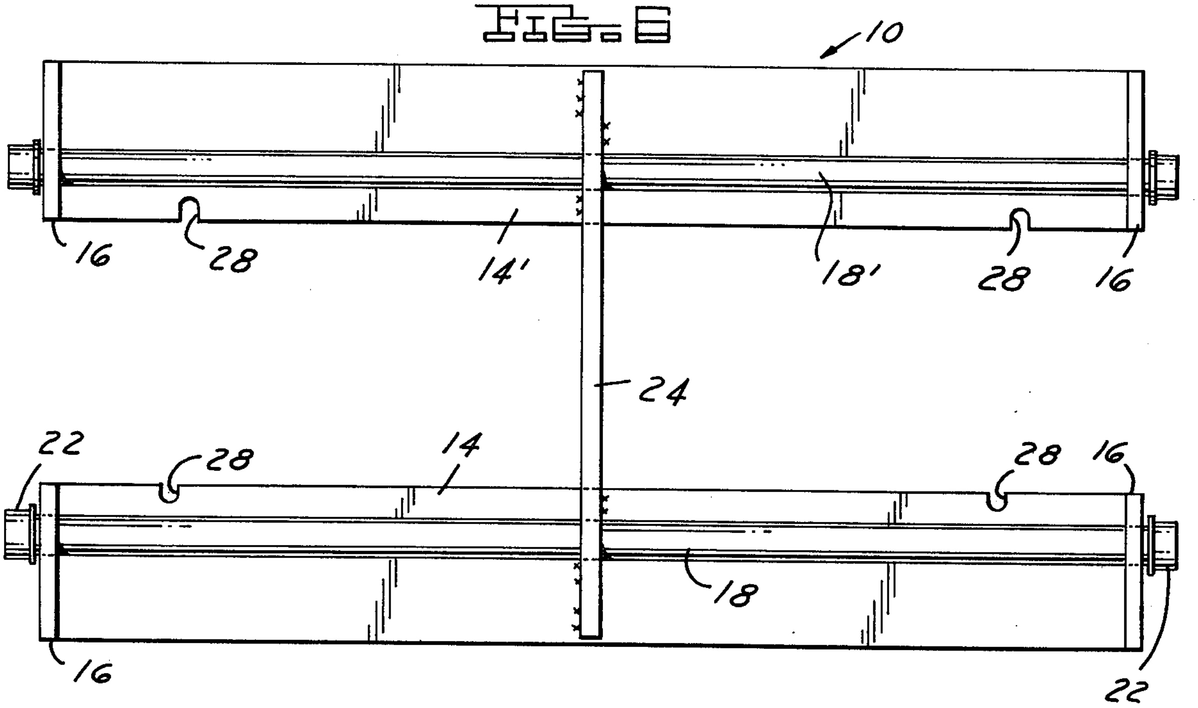
FIG. 6 is a plan view of the support bracket with the two shafts in place.

The lever assembly 12, shown in FIG. 2, includes four main components: depresser assembly 36, attachment link 38 and support leg 40, all three of which are pivotally attached to lever arm 42 by means of pivot pins 44. The depresser leg assembly 36 includes a leg member 46 which is pivotally attached to the lever arm 12 on the upper end, and a foot 48 which is welded to the lower end of the depresser leg 46. Depresser foot 48 cooperates with the periphery of valve spring cap 50 so that the center of the cap is accessible when foot 48 is in place. Attachment link 38 provides a means for removable attachment of the lever assembly 12 to the fulcrum formed by shaft 18. Attachment link 38 has an axis substantially parallel to the effective axis of depresser leg assembly 36 so that when lever arm 42 is rotated, link 38 and leg assembly 36 remain parallel and movement is not hindered by contact with the adjacent components. Depresser foot 48, as shown in FIGS. 1 and 7, is designed to cooperate with the valve spring cap 50, as shown in FIG. 3, so when lever 42 is rotated it causes the depresser leg assembly 36 to depress valve spring cap 50, compressing valve spring 52, as shown in FIG. 4. Once the valve spring 52 is compressed, support leg 40 may be rotated on pivot pin 44 so that the end of the support leg 40 comes in contact with plate 14. Support leg 40 provides a means for retaining the lever in a position holding the spring in a compressed state. The end of the support leg 40 is provided with a series of steps 54 so that when the force which caused lever 42 to rotate is released, support leg 40 will provide a means to lock the lever arm against rotation and thereby hold the valve spring 52 in a depressed state. Lever arm 42 is bent upward as shown and equipped with a grip 56 so that the apparatus is more comfortable for a mechanic to operate. When it is desired to release the valve spring 52, lever 42 is rotated sufficiently to reduce the compressive load on support leg 40 so that it may be pivoted by the mechanic clear of plate 14, allowing the lever 42 to be rotated in the direction causing the valve spring cap 50 to rise.

In order to remove the camshaft 56 from the engine, it is first necessary to remove the rocker arm cover, which is not shown, from the top of the camshaft carrier 30. With the rocker arm cover removed, the support bracket assembly 10 is installed in its place using bolts 32 which engage threaded holes 34 in the camshaft carrier 30 used to hold the camshaft cover in place, as shown in FIGS. 1 and 2. With the support bracket 10 securely fixed to the engine, the lever assembly 12 is placed adjacent to one of the valve spring caps 50. A foot 48 of the depresser leg assembly 36 is placed on top of the valve spring cap 50, as shown in FIGS. 1 and 3. The attachment link 38 is hooked under shaft 18 to provide a fulcrum as shown in FIG. 3. Initially, the support leg 40 rests against the edge of support bracket plate 14. When the mechanic rotates the lever assembly 12, the depresser leg assembly 36 causes the valve spring cap 50 to be depressed as shown in FIG. 4. The support leg 40 rises relative to plate 14 and the support leg swings into position where steps 54 engage plate 14 naturally, without the aid of the mechanic. The mechanic can then release lever grip 56 and the support leg 40 will hold the valve spring 52 in a compressed state. Support leg 40 has several steps 54 so that the valve may be depressed to its maximum travel, in spite of differences between the intake and exhaust valve lengths and production variation.

Figure 5:
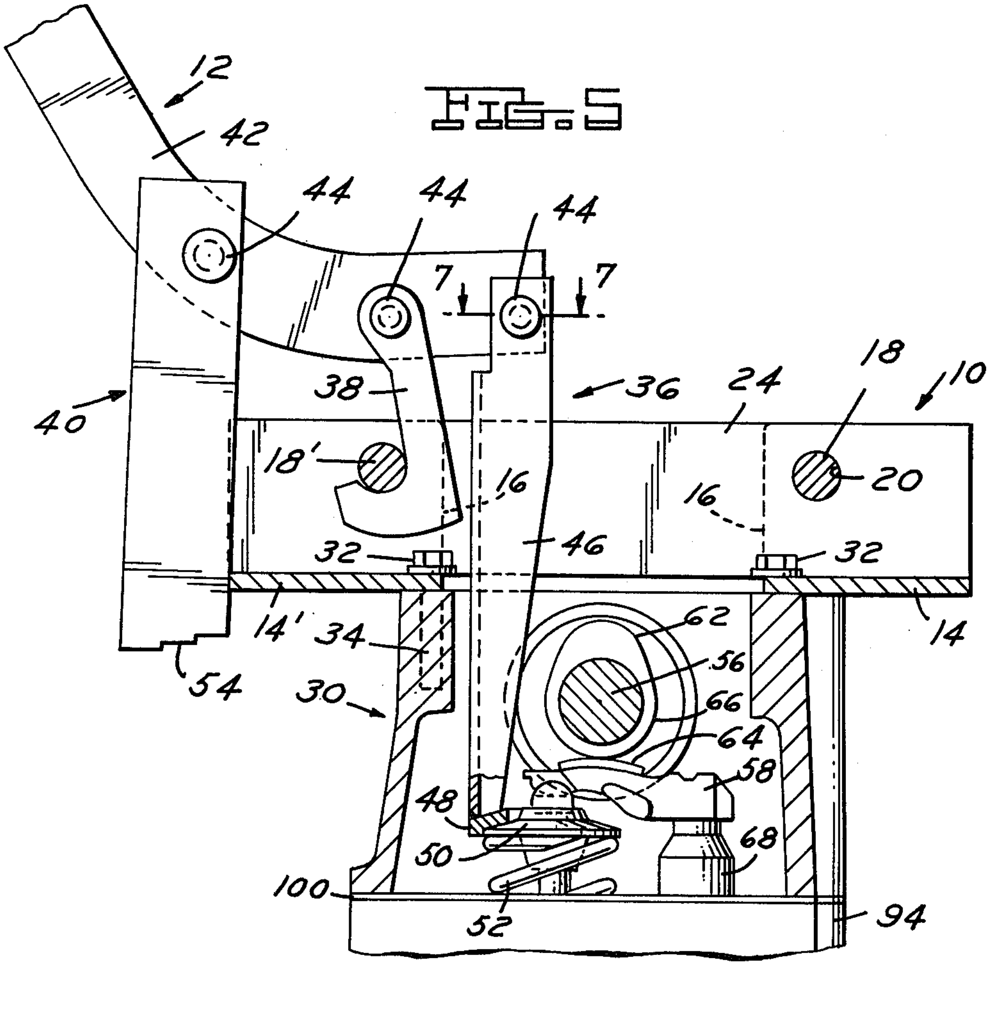
FIG. 5 is a side elevation showing the valve spring compressor installed on an exhaust valve using the other support shaft of the support bracket.

Once the valve spring 52 has been compressed, the mechanic can remove the rocker arm 58 and the rocker arm retainer 60. It is preferable to orient the camshaft 56 in such a manner that lobe 62 is not engaging the contact surface 64 of the rocker arm 58. When the camshaft base circle 66 engages the contact surface 64, there is sufficient clearance with the valve depressed to lift the rocker arm 58 free from the hydraulic lash adjuster 68, as shown in FIG. 4. After the rocker arm 58 has been withdrawn, rocker arm retainer 60 may also be removed. The valve spring 52 may then be released by rotating lever arm 42 sufficiently to allow support leg 40 to be rotated free of plate 14 so that the lever arm 42 may be rotated in the direction of releasing spring tension. The attachment link 38 is then disconnected from shaft 18 and the lever assembly 12 removed. This procedure is repeated for each of the valves until all of the rocker arms 54 and rocker arm retainers 60 have been removed from the engine. The foot 48 of the depresser leg assembly 36 is shown in detail in FIG. 7. This plan view taken along line 7—7 from FIG. 5 shows the detail of flat 70 which is necessary to provide sufficient clearance for the foot on some of the valves where the cam carrier 30 is very close the valve cap 50. The foot 48 is securely welded to depresser leg 46 which is pivotably attached to lever arm 42 by pivot pin 44.

After all of the rocker arms 58 are removed from one side of the cylinder head, the lever assembly 12 is installed on the other shaft 18 so the remaining rocker arms 58 may be removed as shown in FIG. 5. Typically, the intake valves are located on one side of the head and the exhaust valves on the other. In FIG. 4 the lever assembly 12 is attached to shaft 18 adjacent to the row intake valves. In FIG. 5 the lever assembly 12 is shown on shaft 18' adjacent to the row of exhaust valves.

Figure 8:
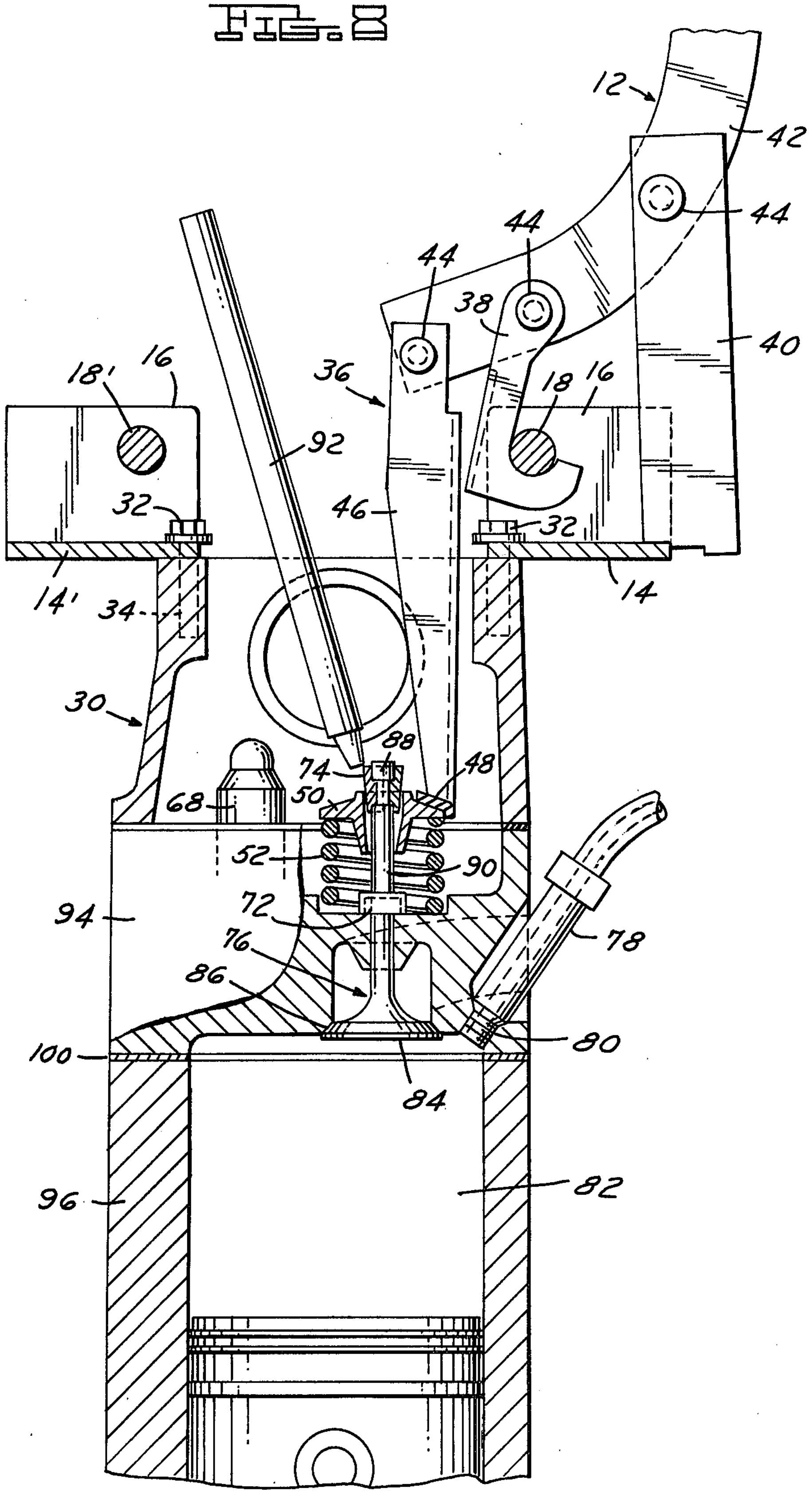
FIG. 8 is a side elevation similar to FIG. 2 but showing the valve spring compressor installed, the camshaft removed, and the valve held on its seat by air pressure, so that the valve keepers can be removed using a magnet.

Once all the rocker arms 58 and rocker arm retainers 60 have been removed, the camshaft 56 may be extracted. With the camshaft 56 out of the way, it is possible to remove and service the hydraulic lash adjusters 68. If it is necessary to service the valve spring 52 or the valve stem seal 72, it is necessary to remove the valve spring cap 50 and the valve keepers 74, shown in FIG. 8. To keep the valve 76 in place while the spring 52 is compressed, an air line adapter 78 is installed in the sparkplug hole 80 and connected to a source of pressurized air. The air line adapter 78 is commercially available from Kent-Moore Tool Division, Roseville, Mich., as Part No. J-22794. The high pressure air entering through air line adapter 78 causes the enclosed cylinder volume 82 to become pressurized, holding valve head 84 firmly against machine seat 86 in the cylinder head. With the cylinder 82 pressurized, the valve 76 remains stationary as the lever assembly 12 is reinstalled and used to depress valve spring cap 50 and valve spring 52, as shown in FIG. 8. Valve keeper 74 can then be removed from the valve stem groove 88 in the end of the valve stem 90 with the use of a magnet 92. As a result of the valve spring compresser's locking feature, both hands are free to remove valve keepers 88. With the keepers 88 removed, the lever assembly 12 can be removed and the cap 50 and the spring 52 removed for service. The stem seal 72 can be slid off the valve stem 90 and replaced if necessary.

Upon servicing or replacing the valve spring 52 or the valve stem seal 72, the engine can be reassembled by reversing the disassembly procedure. Using this tool and method, it is not necessary to remove the cylinder head 94 from the engine block 96 or loosen the cylinder head fasteners 98 and thereby disturb the cylinder head gasket 100.

I claim:

1. A tool for compressing valve springs of a valve-in-head internal combustion engine comprising, in combination:

a lever;

a fulcrum to be temporarily attached to the engine;

an attachment link having two ends, pivotably attached to the lever at the first end and removably attachable to the fulcrum at the second end;

a depresser member having two ends, pivotably attached at one end to the lever at a point spaced from the attachment link pivot and having means at the second end for cooperation with the valve spring cap to depress same while leaving the center of the cap exposed when the lever is pivoted about the attachment link pivot, said depresser member having an effective axis substantially parallel to that of the attachment link.

2. The tool of claim 1 further comprising means for retaining the lever in a position holding the valve spring in a compressed state.

3. The tool of claim 2 wherein the fulcrum further comprises a bracket for attachment to the engine and a shaft cooperating with the bracket to provide a contact surface for the second end of the attachment link so that the lever may be removably attached adjacent the valve springs.

4. The tool of claim 3 wherein the means for retaining the lever in position comprises a support leg having two ends, the first end pivotably attached to the lever at a point spaced from the attachment link pivot, and the second end for cooperating with the bracket to enable the valve spring to be temporarily retained in a depressed state.

5. The tool of claim 3 wherein the support leg is further provided with a plurality of steps on the second end to allow the valve spring to be retained at various depressed positions.

6. The tool of claim 3 for use with an engine having intake valves and exhaust valves and wherein said fulcrum is provided with two shafts spaced apart and alternately usable with said attachment link.

* * * * *